United States Patent Office.

MEINHARD HOFFMANN, OF FRANKFORT-ON-THE-MAIN, GERMANY, ASSIGNOR TO LEOPOLD CASSELLA & CO., OF SAME PLACE.

BLUE DYE.

SPECIFICATION forming part of Letters Patent No. 464,135, dated December 1, 1891.

Application filed May 27, 1891. Serial No. 394,281. (Specimens.) Patented in France June 5, 1891, No. 201,770.

*To all whom it may concern:*

Be it known that I, MEINHARD HOFFMANN, doctor of philosophy, a citizen of the Empire of Germany, and a resident of Frankfort-on-the-Main, Germany, have invented certain new and useful Improvements in the Production of New Blue Coloring-Matters, (for which I have obtained a patent in France, dated June 5, 1891, No. 201,770,) of which the following is a specification.

The object of my invention is the production of new blue coloring-matters dyeing unmordanted cotton bright blue shades and surpassing in all respects the dye-stuffs used hitherto for the same purpose.

In carrying out my invention I proceed as follows: The diamidonaphthaline-alpha-disulpho-acid (Beilstein's Chemistry, Vol. III, 1025) heated with diluted mineral acids is decomposed in a particular way. Losing one of its amido groups, it is transformed into a new amidonaphthol-disulpho-acid, which I name "acid H." The latter I combine with tetrazo-diphenyl or its analogues.

Example: Thirty-five kilos of the diamidonaphthaline-alpha-disulpho-acid (which may be obtained by double nitration and reduction of the naphthaline-disulphonic-acid 2.7) are heated with one hundred and eighty liters of water and thirty-four kilos sulphuric acid during about six hours at 100° to 130° centigrade. Fine yellowish needles separate from the cooled mass, representing the acid ammonia salt of the acid H, which is difficultly soluble in water, and which can be purified by crystallization. The reaction corresponds to the formula

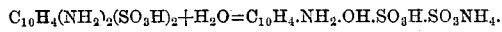

To thirty-four kilos of the acid H dissolved in water by means of carbonate of soda the tetrazo derivative of 9.2 kilos benzidine is introduced. The solution is kept alkaline. After a short time the coloring-matter separates in needles, showing a metallic reflection. In this example benzidine may be substituted by other paradiamines, such as tolidine, methylbenzidine, diamidoaethoxydiphenyl, diamidodiphenyl ether. The resulting coloring-matters dye unmordanted cotton in an alkaline or neutral bath very bright blue shades, which are not changed by alkalies or by acids.

What I claim as new, and desire to secure by Letters Patent, is—

1. The process of producing blue coloring-matters by mixing together solutions of the herein-described amidonaphthol-disulpho-acid H and of the tetrazo derivatives of paradiamines and sufficient alkali to keep the solution alkaline, substantially as set forth.

2. The blue coloring-matter produced from the acid H, having the following characteristics: it forms a dark bronze-like powder, easily soluble in water, with a blue color which is not changed by addition of carbonate of soda; it is insoluble in alcohol and ether; in strong sulphuric acid it dissolves with a pure blue shade; if this solution is diluted with water, the free acid of the dye-stuff separates in form of a reddish-blue amorphous precipitate.

In testimony that I claim the foregoing as my invention I have signed my name, in presence of two witnesses, this 15th day of May, 1891.

M. HOFFMANN.

Witnesses:
 JEAN GRUND,
 FRANK H. MASON.